J. REICHERT.
CALF AND COLT WEANER.
APPLICATION FILED OCT. 2, 1919.
1,346,557.
Patented July 13, 1920.
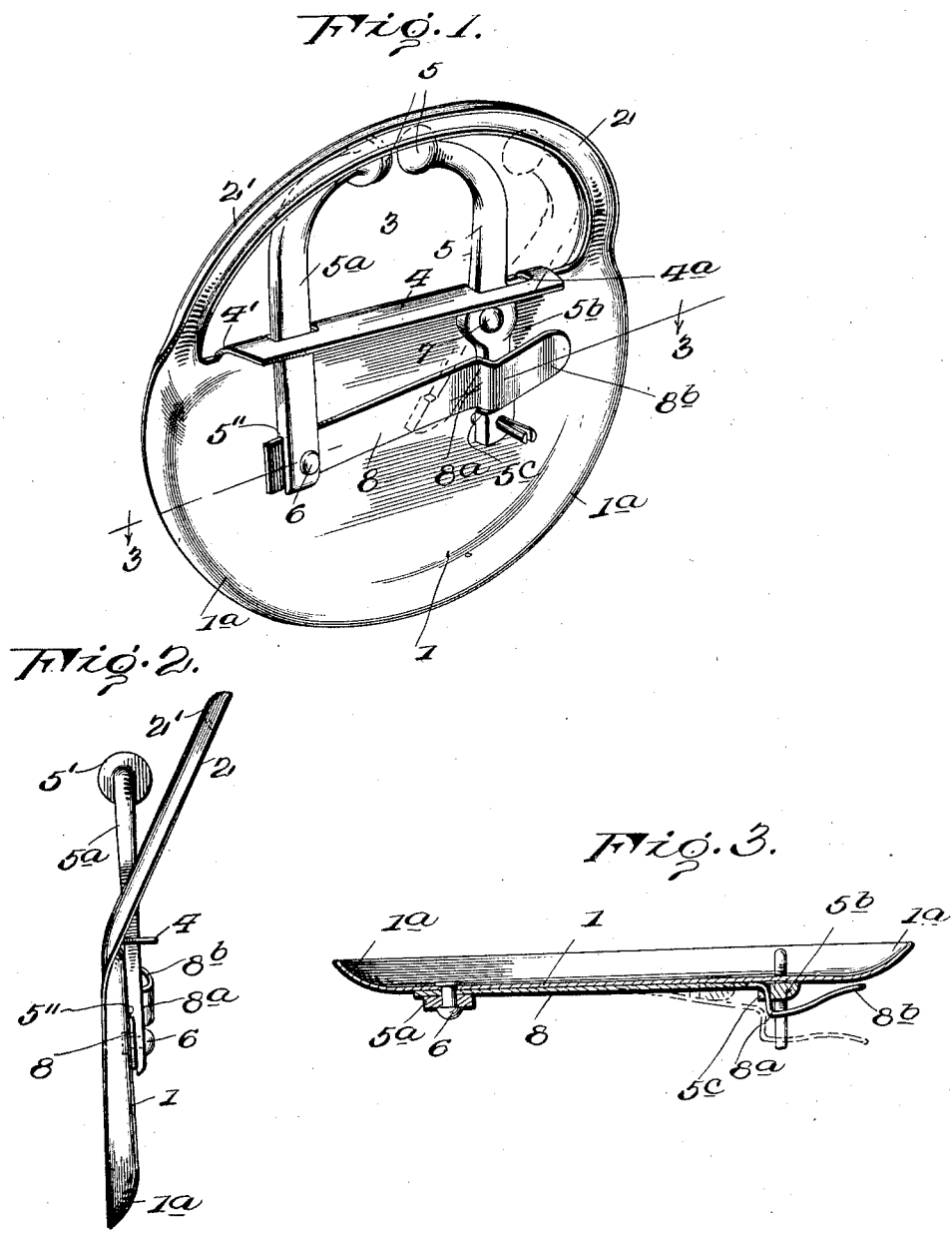
Inventor.
John Reichert.
by Herbert E Peck
his Atty.

UNITED STATES PATENT OFFICE.

JOHN REICHERT, OF RACINE, WISCONSIN.

CALF AND COLT WEANER.

1,346,557.  Specification of Letters Patent.  Patented July 13, 1920.

Application filed October 2, 1919. Serial No. 327,855.

*To all whom it may concern:*

Be it known that I, JOHN REICHERT, a citizen of the United States of America, and resident of Racine, Racine county, State of Wisconsin, have invented certain new and useful Improvements in and Relating to Calf and Colt Weaners, of which the following is a specification.

This invention relates to certain improvements in colt and calf weaners; and the objects and nature of the invention will be readily understood by those skilled in the art in the light of the following explanation of the accompanying drawings illustrating what I now believe to be the preferred mechanical expression or embodiment of my invention from among other forms, constructions and arrangements within the spirit and scope thereof.

An object of the invention is to provide improved means for attachment to the nose of a domestic animal to so shield the animal's mouth as to prevent the animal gaining access to a teat for the purpose of extracting milk therefrom, and the weaner or shield of my invention is characterized by an apron or shield plate formed or provided with an upwardly extending guard and stop loop to engage the nose or muzzle and limit upward swing of the apron with respect to the mouth and also to guard the corners of the mouth against lateral extension of the animal's tongue to grasp a teat, and the weaner of my invention without respect to said guard loop, is also characterized by certain peculiarities in the manner of mounting and securing the securing horns or fingers and a spring latch or lock for the movable horn or finger.

With these and other objects in view my invention consists in certain novel features in construction and in combinations and arrangements as more fully and particularly described and pointed out hereinafter.

Referring to the accompanying drawings:—

Figure 1, is a perspective view of a weaner or shield constructed in accordance with my invention, dotted lines showing one of the fingers or horns swung to open or inoperative position.

Fig. 2, is an edge elevation.

Fig. 3 is a horizontal section on the line 3—3, Fig. 1.

In the particular example illustrated, the apron or shield 1, is composed of sheet metal, and is struck or pressed from the flat sheet to provide the upwardly extending forwardly deflected guard and stop loop 2 integral with the shield or apron. The edge portion $1^a$ of the apron, below its top edge, is preferably curved rearwardly so that the rear side of the apron, the side next to the animal's muzzle, is approximately concave, and the front or outer side thereof, approximately convex. In the particular example illustrated, the apron and loop are formed from an approximately circular disk of sheet metal, the upper portion of the disk being cut out to form the guard loop and an opening 3 to approximately receive the animal's muzzle or nose. A portion of the metal from this opening can be bent forward in the form of a flange 4 to provide the straight top edge of the apron with a rounded straight rear surface 4' that will not injure the animal's tongue or mouth. The guard loop 2 forms an upward arch that is continuous from one upper outer corner of the apron 1 to the opposite upper corner thereof, and the sheet metal forming this arch is preferably pressed into U-shape in cross section to present a smooth rounded rear surface 2', for engagement with the animal's nose and mouth, and to stiffen and strengthen the structure. This yoke or arch is also deflected or inclined forwardly from the apron plate 1 to permit proper location of the suspending and securing horns or fingers with respect to the apron plate and the guard loop or arch.

In the particular example illustrated, these horns or fingers 5, $5^a$, are secured to the front side of the apron plate and extend vertically therefrom through the flange 4 and into the opening 3 so that the upper ends of the fingers are arranged approximately to the rear of the upper part of the loop or arch. The fingers have approximately straight vertical shanks while the upper ends of the fingers extend in opposite directions toward each other and are formed with free end rounded enlargements 5' to enter the opposite nostrils and engage the septum, as is common in this art. The finger 5ᵃ is fixed in position, while the finger 5 is pivoted to swing laterally to and from operative position while applying and removing the weaner as will be readily understood by those skilled in the art.

The finger 5ᵃ is secured in fixed position by snugly fitting in a slot in the flange 4 and by tight rivet 6 passed through the apron plate and lower end of the shank of said finger.

The finger 5 is rendered swingable by passing through an elongated slot 4ᵃ in flange 4 and by the loose rivet or pivot 7 passing through the apron plate and the shank of the finger intermediate the length thereof or at a point just below and comparatively close to the flange so as to provide the finger shank with the comparatively long depending free end 5ᵇ movable in the opposite direction from the upper nose engaging end of the finger. The swing of the upper end of finger 5 toward the finger 5ᵃ is limited by the inner end wall of the flange slot 4ᵃ. Suitable means are provided to lock the finger 5 in normal or operative position and whereby the finger 5 can be released to permit opening swing thereof to inoperative position. The portion 5ᵇ of this finger is utilized as the locking bolt thereof, and a spring lock or latch is provided to coöperate therewith.

For instance, I show a stiff strong plate spring 8 arranged horizontally or transversely on and against the front face of the apron plate and traversing the shanks of the two fingers, and this spring is secured in a novel and advantageous manner. The lower end of the shank or finger 5 is recessed or rabbeted at its inner side to form a seat and straight shoulder 5″ to receive the left hand (Fig. 1) end of spring 8 and fit its upper longitudinal edge. The end of the spring is thus received between the shank and surface of the plate and thus rigidly clamped and secured by the rivet 6 which passes through the plate, spring and finger shank. The shoulder 5″ abuts the top edge of the spring and thus braces and holds the spring against upward swing or movement. The spring is so arranged and secured that its tension is exerted in holding the free end of the spring constantly toward the surface of the apron plate.

The right hand (Fig. 1) or free end of this spring is off-set outwardly to form an abrupt or square stop shoulder 8ᵃ and an elevated finger piece 8ᵇ. The locking bolt 5ᵇ of the swinging finger is arranged under the finger piece 8ᵇ which projects laterally or to the right beyond said bolt. The inner longitudinal edge of the locking bolt 5ᵇ i. e. the edge of said bolt facing the fixed finger 5ᵃ and adjacent to the spring shoulder 8ᵃ is recessed or notched to squarely abut the shoulder 8ᵃ and to form an upwardly facing shoulder or square edge 5ᶜ to project under and engage the lower edge of the spring at the lower end of shoulder 8ᵃ.

The arrangement is such that when the swingable finger 5 is in normal position (full lines, Fig. 1) the longitudinal edge and the shoulder 5ᶜ of the locking bolt of said finger, squarely abut the shoulder 8ᵃ and lower edge of the spring and the swingable finger is thereby most solidly and firmly held against opening movement.

When it is desired to release the swingable finger for opening swing, it is merely necessary to press the free end of the spring in a direction away from the apron plate by engaging the finger with finger piece 8ᵇ. When the spring has been sprung outwardly a sufficient distance, the bolt end 5ᵇ of the finger can swing toward the left under the flat portion of the spring. The spring is then released and will bear tightly against the finger and hold the same in opened position (dotted lines Figs. 1 and 3) which is a feature of advantage. To then close the finger to and secure the same in normal operative position, it is only necessary to press the upper end of the finger toward the left and when the finger reaches closed or operative position the spring will automatically snap to locking position (full lines Fig. 1).

If so desired, perforations can be provided in the apron plate and lower extremity of the locking bolt 5ᵇ so arranged as to register when the finger 5 is in closed operative position. The finger can then be locked in such position by a cotter pin 10. However, this is an emergency provision particularly for use should the plate spring break or become inoperative, and I do not wish to so limit my invention.

The arrangement of the pivot of the swingable finger to provide a locking bolt in connection with the relative arrangement of the locking spring provides an exceedingly firm structure wherein the pivot 7 in large part sustains stresses and thrusts tending to force the finger to opened position and under such stresses and forces the locking bolt is rigidly held not only by the tension of the spring but also by the engagement between the bolt shoulder 5ᶜ and the edge of the spring. Peculiar advantages are gained by the provision of the stop and guard loop or arch joining and merging into the upper corners of the apron plate at points spaced laterally substantial distances from the fingers 5, 5ᵃ, as guards are thereby provided against the calf or other animal gaining hold of teats from the side of its mouth or by extending his tongue laterally from his mouth. As before stated the guard loop will engage down on the nose and prevent the calf throwing the apron plate upwardly a sufficient distance to enable the calf to reach under the plate and grasp the teat. Further this loop or arch braces and stiffens the plate of which it forms a part.

I do not wish to limit my invention to the passage of the fingers through openings in the flange 4 as the fingers can be otherwise braced, said flange primarily providing the apron plate with a doubled or rounded upper edge, and hence the flange can be otherwise formed and shaped and in reality forms no part of my present invention.

It is evident that various changes, modifications and variations might be resorted to without departing from the spirit and scope of my invention and hence I do not wish to limit myself to the exact disclosure hereof.

What I claim is:—

1. A weaner comprising a stiff metal apron plate having a rigid guard and stop loop extending upwardly and outwardly at an obtuse angle from its upper outer corners and formed integral therewith, and suspending fingers secured to the plate and extending upwardly therefrom through the opening formed by said loop and spaced inwardly from the laterally projecting opposite end portions of the loop, one of said fingers being pivoted to said plate and having locking means, said fingers adapted to be received in the nostrils of an animal so that said apron plate is suspended in front of the animal's muzzle with the stop loop overlying the muzzle to allow substantially slight forward tilting of said apron away from the animal's mouth.

2. A weaner comprising a sheet metal apron plate having a guard and stop loop integral therewith and extending upwardly therefrom and approximately U-shape in cross section, and suspending fingers secured to the plate and extending upwardly into the opening of said loop.

3. A weaner characterized by an apron plate having a forwardly deflected rigid stop loop rigid therewith and rising from its opposite upper outer corners and forming an opening above the plate, said plate and loop composed of a piece of stiff sheet metal, and separate upstanding suspending fingers secured to the plate and rising in said opening, and arranged to be received in the nostrils of an animal so that said apron plate is suspended in front of the animal's muzzle with the stop loop overlying the muzzle to allow substantially slight forward tilting of said apron away from the animal's mouth, the loop projecting laterally substantial distances beyond said fingers to guard the sides or corners of the calf's mouth.

4. A weaner having suspending fingers, at least one of said fingers being swingable and having locking means, said weaner being characterized by an apron to depend in front of the animal's mouth, formed with a rigid-apron-stiffening forwardly-deflected stop loop extending upwardly from the apron and arranged to overlie the animal's muzzle to allow substantially slight forward tilting of said apron away from the animal's mouth, said apron and loop composed of a single stiff metal plate.

5. A weaner having separate suspending fingers relatively-movable to opened and closed positions, and a stiff apron plate composed of a piece of metal having an opening cut therein to receive said fingers and to form an arched upwardly extending guard and stop loop, said fingers adapted to be received in the nostrils of an animal so that said apron plate is suspended in front of the animal's muzzle with the stop loop overlying the muzzle to allow substantially slight forward tilting of said apron away from the animal's mouth.

6. A calf weaner comprising a dished metal apron plate, suspending fingers rising therefrom and secured to the front side thereof, and an arched dished rigid guard and stop loop integral with and extending upwardly from the upper outer corners of said plate and deflected forwardly with respect to and spaced from the fingers.

7. A weaner comprising an apron plate, a fixed suspending finger rising therefrom and at its shank secured to said plate, a coöperating suspending finger pivotally joined to the plate, and a plate spring traversing said fingers and having a free end formed for locking said pivoted finger in operative position, said plate spring being clamped between said plate and the fixed finger and secured by the same means that secures the fixed finger.

8. A weaner comprising an apron plate and a pair of suspending fingers secured thereto and rising therefrom, one of said fingers being fixed and the other pivoted, a plate spring on the apron plate and forming a spring lock for the pivoted finger, said spring being secured by the fixed finger and fitted between the fixed finger and the surface of the plate, said fixed finger having a rabbeted portion and shoulder receiving said spring.

9. A weaner comprising an apron plate and a pair of suspending fingers secured thereto and rising therefrom, one of said fingers being pivoted, said pivoted finger having a free end depending from the axis on which it swings and formed with an upwardly facing shoulder, and a plate spring secured to said apron plate and tending to spring thereto and offset to form an abutment, said free end arranged to engage said abutment and said upwardly facing shoulder to engage the lower edge of the spring to lock the finger against opening movement.

10. A weaner comprising a guard plate, suspending fingers rising therefrom and having shanks extending down along the surface of said plate and secured thereto, one of said fingers being swingable on an axis located between its opposite ends, one of said ends forming a locking bolt having a lateral shoulder, and a plate spring pressing against said plate and secured thereto with its free end extending transversely over said locking bolt and offset above said lateral sholder, said lateral shoulder arranged to bear upwardly against the lower edge of said offset to lock the swingable finger in operative position, said bolt arranged to swing toward the secured end of the spring and between the spring and plate when released and swung toward opened position.

JOHN REICHERT.